United States Patent Office 3,376,673
Patented Apr. 9, 1968

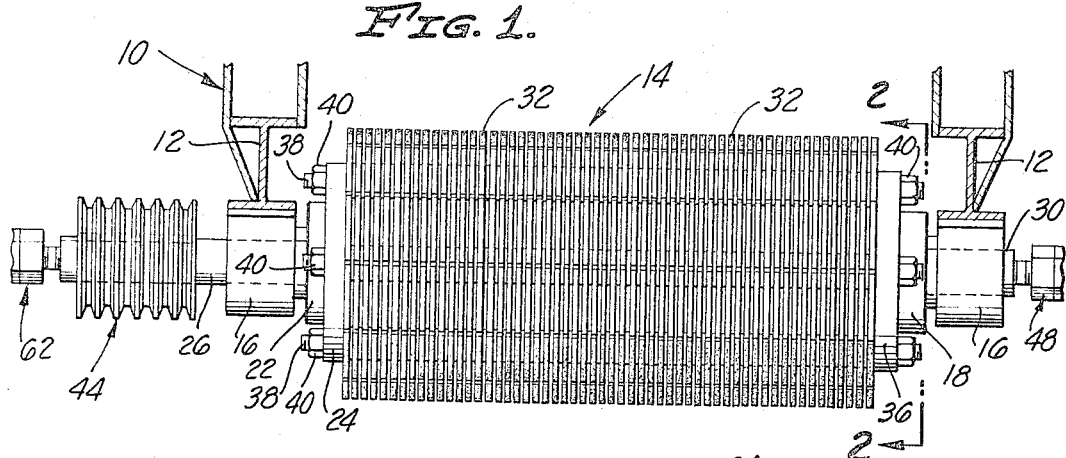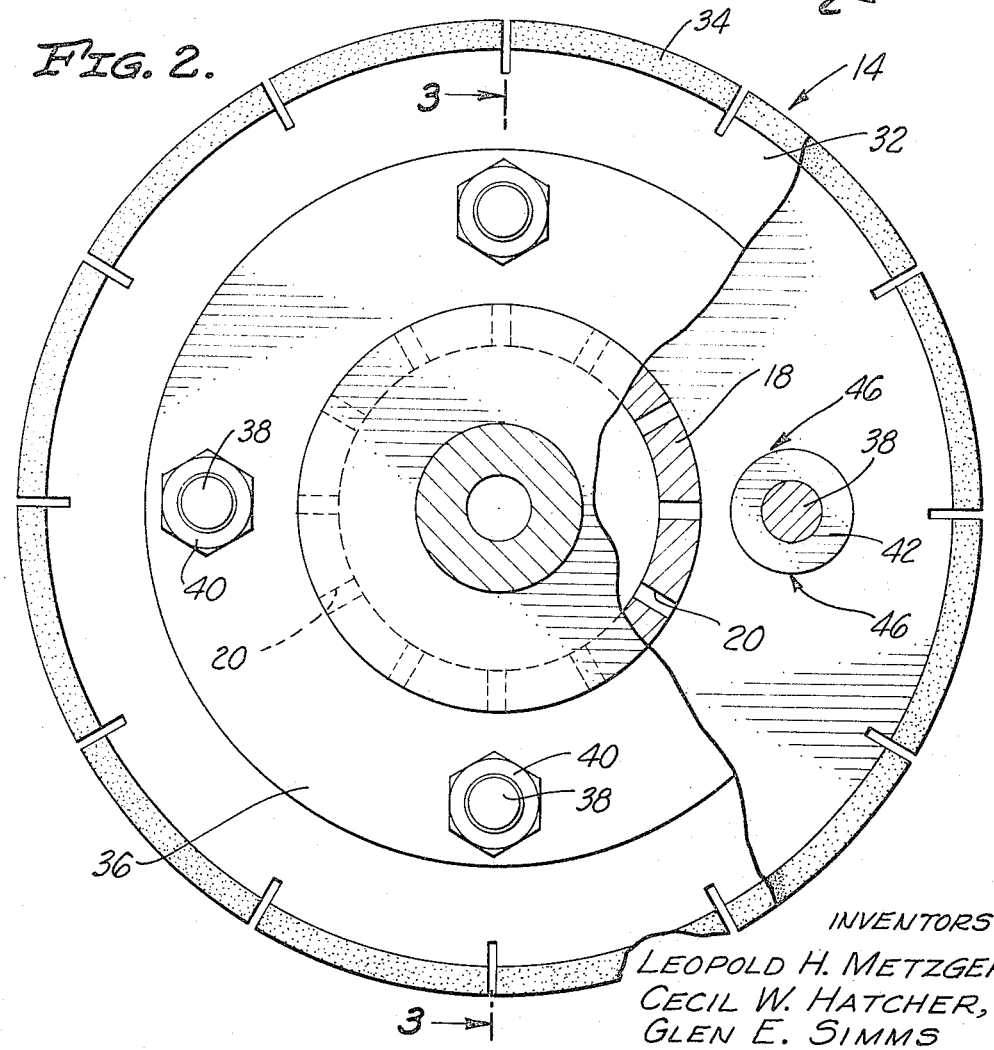

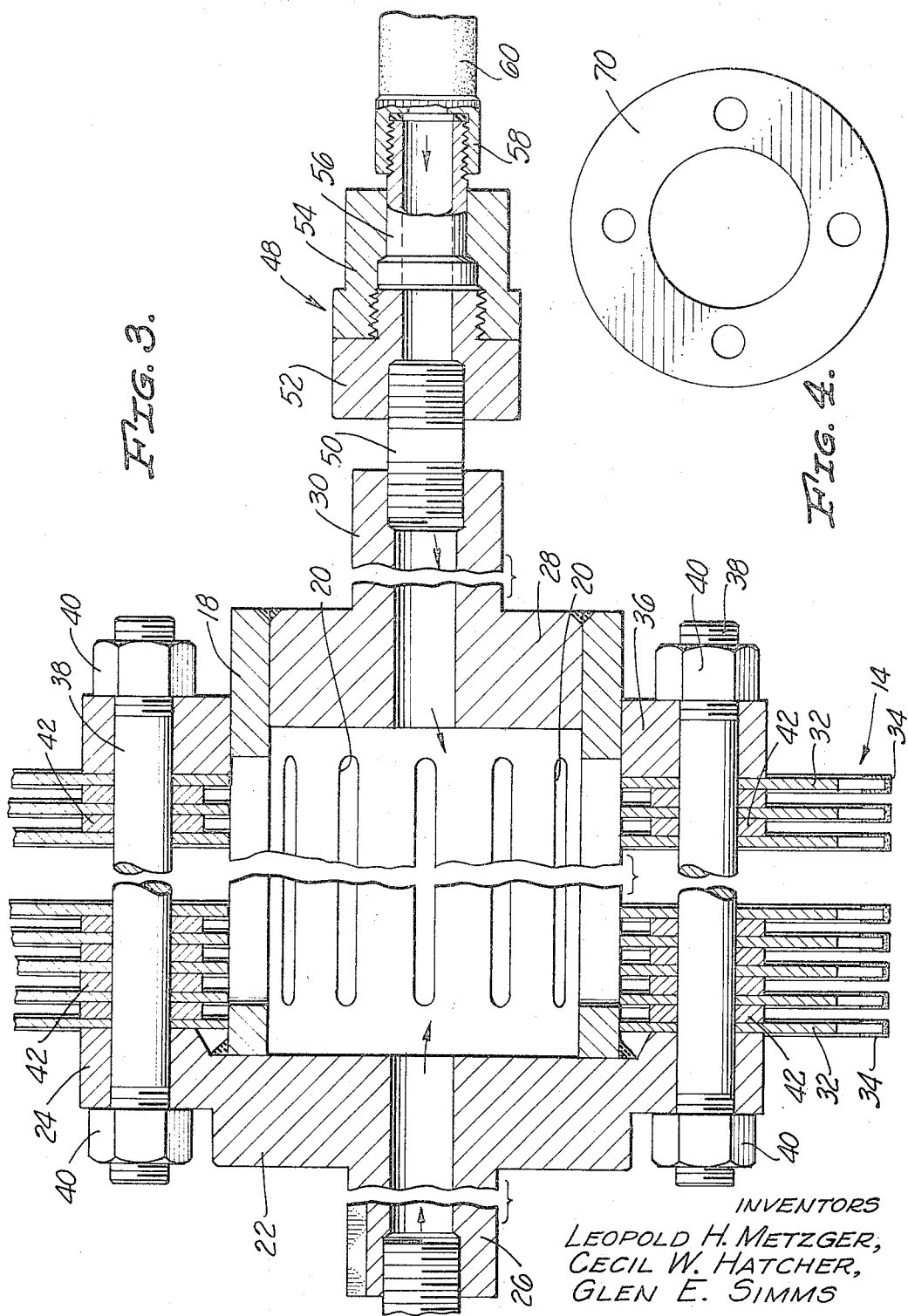

3,376,673
ROTARY CUTTER ASSEMBLY FOR
CONCRETE LEVELER
Leopold H. Metzger, Glencoe, Ill., and Cecil W. Hatcher, West Covina, and Glen E. Simms, Glendora, Calif., assignors, by mesne assignments, to Super-Cut, Inc., a corporation of Illinois
Filed Sept. 8, 1964, Ser. No. 394,797
3 Claims. (Cl. 51—168)

The present invention relates in general to rotary means for cutting pavement, and particularly concrete pavement, to remove bumps therefrom, to increase the skid resistance thereof, and the like. The rotary cutter means of the invention may, for example, be incorporated in: the pavement leveling machine disclosed in Patent No. 3,007,687, granted Nov. 7, 1961 to Cecil W. Hatcher; the pavement leveling machine disclosed in copending application Ser. No. 150,039, filed Nov. 3, 1961, by Cecil W. Hatcher, now Patent No. 3,195,957, issued July 20, 1965; or the constant-depth pavement grooving machine disclosed in copending application Ser. No. 286,032, filed June 6, 1963 by Cecil W. Hatcher, now Patent No. 3,269,775, granted Aug. 30, 1966.

Primary objects of the invention are to provide a rotary cutter means which is more rigid than prior devices of this nature, and to provide improved means for delivering a coolant, such as water, to the cutter means, the increased rigidity of the cutter means and the improved means for delivering a coolant thereto both contributing to minimizing wear of the cutter means. A related object is to provide means for delivering a coolant to the cutter means which operates centrifugally to insure an adequate coolant supply.

In general, the invention contemplates a rotary cutter means comprising a mandrel having disc-like annular cutters mounted thereon in axially spaced relation, these cutters having abrasive outer peripheries, composed of diamond particles, or other abrasive particles, adapted to cut grooves in the pavement. The axial spacing of the annular cutters, which is maintained by spacers disposed between the cutters and formed integrally therewith, or separately therefrom, is determined by the nature of the operation to be performed on the pavement. For example, when leveling pavement, the annular cutters are relatively closely spaced, whereas, when cutting skid resisting grooves in the pavement, the cutters are more widely spaced.

In the past, it has been the practice to utilize a solid mandrel of relatively small diameter and to clamp the annular cutters and the spacers between an annular flange at one end of the mandrel and an annular washer engaged by a nut threaded onto the other end thereof. With this prior construction, annular spacers encircling the mandrel were used, and it was necessary to key the annular cutters and spacers to the mandrel. Also, it has been the practice to deliver a coolant to the outer peripheries of the annular cutters with a spraying means positioned externally of the rotary cutter assembly.

It has been found that the foregoing prior construction is subject to several disadvantages. First of all, the relatively small-diameter mandrel tends to flex in operation due to side loads imposed by the pavement being cut and due to any unbalance in the assembly. Consequently, the outer peripheries of the annular cutters do not run true, i.e., they do not run exactly in planes perpendicular to the desired axis of rotation. This causes excessive wear of the abrasive outer peripheries. Second, since the annular cutters are clamped adjacent their centers or inner peripheries only, the clamping force tends to dish them slightly so that their outer peripheries do not run true. Again, this produces excessive wear. Further, it is difficult with the external spraying means mentioned to apply sufficient water, or other coolant, to the annular cutters to cool them adequately, it being apparent that the externally applied coolant tends to be thrown off almost immediately by centrifugal action.

Important objects of the invention are to overcome the foregoing and various other disadvantages of prior constructions by providing a rotary cutter assembly which includes: a tubular mandrel of relatively large diameter provided with radial ports therein; an annular anchor member secured to the mandrel at one end thereof and projecting radially outwardly therefrom; annular cutters encircling and slidable axially of the mandrel; spacing means between the annular cutters for spacing the annular cutters apart axially of the mandrel; and annular clamping member slidable axially of the mandrel adjacent the other end thereof and projecting radially outwardly therefrom; circumferentially spaced clamping bolts spaced radially outwardly from the mandrel and extending through the anchor member, the annular cutters, the spacing means and the clamping member for clamping the annular cutters and the spacing means together in the axial direction; the spacing means comprising circumferentially spaced annular spacers encircling the bolts and providing between the annular cutters radial outlet passages communicating at their inner ends with the radial outlet ports; and means for introducing water into the interior of the mandrel through at least one end thereof.

Utilizing a relatively large-diameter tubular mandrel minimizes mandrel flexure in operation, thereby insuring that the outer peripheries of the annular cutters run substantially true. Clamping the annular cutters and the spacers together with clamping bolts spaced radially outwardly from the mandrel minimizes any tendency to dish the annular cutters, and thus also contributes to the trueness with which the outer peripheries of the annular cutters run. Both of these factors minimize wear of the abrasive outer peripheries.

Introducing water, or other coolant, into the interior of the tubular mandrel, from which it can flow radially outwardly through the outlet ports in the mandrel and the outlet passages between the spacers under the influence of centrifugal force, insures the delivery of coolant to the annular cutters in quantities sufficient to maintain their temperatures well within the desired limits, thereby further minimizing wear.

The foregoing objects, advantages, features and results of the present invention, together with various other objects, advantages, features and results thereof which will be evident to those skilled in the art to which the invention relates in the light of this disclosure, may be achieved with the exemplary embodiment of the invention described in detail hereinafter and illustrated in the accompanying drawings, wherein:

FIG. 1 is a fragmentary transverse sectional view through a pavement cutting machine showing in elevation the rotary cutter assembly of the invention;

FIG. 2 is an enlarged transverse sectional view through the rotary cutter assembly of the invention and is taken as indicated by the arrowed line 2—2 of FIG. 1;

FIG. 3 is a fragmentary longitudinal sectional view through the rotary cutter assembly of the invention and is taken as indicated by the arrowed line 3—3 of FIG. 2 of the drawings; and FIG. 4 is an elevational view of an alternative spacer on a reduced scale.

In FIG. 1 of the drawings, the numeral 10 designates a pavement-cutting-machine frame which may, for example, correspond to the frame 2 of the aforementioned Hatcher Patent No. 3,007,687. The frame 10 is shown as including two transversely-spaced frame members 12 which extend longitudinally of the machine. The rotary cutter assembly of the invention is designated generally by the numeral 14 and is shown as mounted on the frame 10 by means of bearings 16 suitably connected to the respective frame members 12.

As best shown in FIGS. 2 and 3 of the drawings, the rotary cutter assembly 14 includes a tubular mandrel 18 of relatively large diameter which is provided therein with radial outlet ports 20 shown as comprising circumferentially spaced slots extending longitudinally of the mandrel. Welded, or otherwise secured, to one end of the tubular mandrel 18 is an annular anchor member 22 which closes that end of the mandrel and which includes an annular flange 24 projecting radially outwardly from the mandrel. Secured to the anchor member 22, as by being formed integrally therewith, is a tubular shaft 26 which is coaxial with the mandrel 18 and which projects through and is supported by the adjacent one of the bearings 16. Welded, or otherwise secured, to the other end of the mandrel 18 is a closure member 28. Connected to the closure member 28, as by being formed integrally therewith, is a tubular shaft 30 which is also coaxial with the mandrel 18. The tubular shaft 30 extends through and is supported by the other of the two bearings 16.

Telescoped over the tubular mandrel 18 in axially spaced relation are annular cutters 32 the inner peripheries of which axially slidably engage the external periphery of the mandrel. The annular cutters 32 are provided with abrasive outer peripheries 34 capable of grooving concrete pavement, or the like.

The annular cutter 32 at one end of the series is seated against the annular flange 24 of the anchor member 22. An annular clamping member 36 is seated against the annular cutter 32 at the other end of the series. Circumferentially spaced clamping bolts 38, spaced radially outwardly from the tubular mandrel 18, extend through the annular flange 24 of the anchor member 22, the annular cutters 32 and the annular clamping member 36. The clamping bolts 38 are shown as provided with nuts 40 at both ends thereof.

The annular cutters 32 are axially spaced apart by circumferentially-spaced washer-like annular spacers 42 which are disposed between each pair of adjacent annular cutters and which encircle the respective clamping bolts 38. As will be apparent, when the nuts 40 are tightened, the clamping bolts 38 clamp the annular cutters 32 and the annular spacers 42 between the annular flange 24 on the anchor member 22 and the annular clamping member 36. Also, the clamping bolts 38 serve to key the annular cutters 32 and the annular spacers 42 to the tubular mandrel 18 through the anchor member 22.

The foregoing construction results in a rotary cutter assembly 14 which is quite rigid and which causes the annular cutters 32 to run true, there being no flutter of the annular cutters tending to cause them to deviate from the paths of the grooves they cut in pavement. This trueness results in considerably longer cutter life, which is an important feature. One reason for the trueness with which the annular cutters 32 run is the relatively-large-diameter tubular mandrel 18, which has considerably more rigidity than a smaller-diameter solid mandrel of the same weight. Another reason is that the clamping bolts 38 clamp the annular cutters 32 together at points spaced radially outwardly from the mandrel 18, thereby minimizing any tendency to dish the annular cutters. Furthermore, the points at which the annular cutters 32 are clamped together are relatively close to the abrasive outer peripheries 34 thereof, thereby providing more support for such outer peripheries and thus tending to prevent flutter thereof.

The annular cutting means formed by the series of annular cutters 32 is adapted to be rotated by a multiple-groove pulley 44 carried by the shaft 26 outwardly of the corresponding bearing 16. The pulley 44 is keyed, or otherwise nonrotatably connected, to the shaft 26 and is adapted to have multiple belts, not shown, trained therearound. In this connection, attention is directed to the aforementioned Hatcher patent and copending applications.

In order to cool the annular cutters 32, and to wash away the cuttings produced thereby, water, or other coolant, is introduced into the interior of the tubular mandrel 18 through at least one end thereof. The water thus introduced into the tubular mandrel 18 is discharged centrifugally through the radial outlet ports 20, which communicate with radial outlet passages 46 defined by the axially-spaced annular cutters 32 and the circumferentially-spaced annular spacers 42 therebetween. As will be apparent, the water, or other coolant, flows outwardly through the radial outlet passages under the influence of centrifugal force to cool the abrasive outer peripheries 34 of the annular cutters 32 and to wash away cuttings produced thereby. This centrifugal delivery of coolant to the abrasive outer peripheries 34 of the annular cutters 32 insures an ample coolant supply to the annular cutters even at high rotational speeds.

Referring to FIG. 3 of the drawings, water may be introduced into the interior of the tubular mandrel 18 through a swivel fitting 48 connected to and communicating with the tubular shaft 30. In the particular construction illustrated, a nipple 50 is threaded into the tubular shaft 30 and the swivel fitting 48 is threaded onto such nipple. The swivel fitting 48 is shown as comprising threadedly interconnected housing elements 52 and 54 which house and are rotatable relative to a flanged nipple 56 having a hose coupling 58 connected thereto. Attached to the hose coupling 58 is a hose 60 leading to a suitable source, not shown, of water, or other coolant. If desired, coolant may be supplied to both ends of the tubular mandrel 18 by providing the other tubular shaft 26 with a similar swivel fitting 62, FIG. 1.

In some instances it may be desirable to replace the circumferentially spaced annular spacers 42 between each pair of cutters 32 with a single, disc-like or ring-like spacer 70, FIG. 4, through which the bolts 38 extend in the same manner as they extend through the individual annular spacers 42. This construction has all the advantages of rigidity hereinbefore discussed, and has the further advantage of preventing accumulations of cutting residues between the cutters 32. However, it is necessary in this case to use an external water spraying means similar to that disclosed in the aforementioned Hatcher Patent No. 3,007,687, for example. Also, it is not necessary to provide the mandrel 18 with the radial ports 20.

Although an exemplary embodiment of the invention has been disclosed herein for purposes of illustration, it will be understood that various changes, modifications and substitutions may be incorporated in such embodiment without departing from the spirit of the invention as defined by the claims which follow.

We claim:

1. A rotary cutter assembly of generally cylindrical configuration and having coaxial trunnions at the ends thereof for reception in supporting bearings, said assembly comprising:

(a) an elongated cylindrical mandrel of relatively large diameter;

(b) a pair of supporting shafts coaxial with the mandrel, projecting axially from the opposite ends thereof, and serving to establish said trunnions;

(c) a relatively thick, circular, disk-like anchor member fixedly secured to one end of said mandrel, coaxial therewith, and of a diameter slightly larger than the diameter of the mandrel whereby the rim region of the anchor member overhangs the outer cylindrical surface of the mandrel and projects radially outwardly beyond the same to thus establish an annular reaction flange;

(d) a series of relatively thin, flat, annular, disk-like cutters encircling said mandrel and axially slidable thereon;

(e) a spacer element interposed between the cutters of each pair of adjacent cutters;

(f) a relatively thick, annular, clamping member encircling said mandrel positioned adjacent to the other end thereof, likewise axially slidable thereon, and disposed wholly outside the cylindrical confines of the mandrel; and (g) a series of circumferentially spaced clamping bolts positioned radially outwardly from said mandrel, extending through said relatively thick reaction flange, said annular cutters, said spacer elements, and said relatively thick annular clamping member, and serving to draw the clamping member axially toward the reaction flange and thus compress the cutters and spacer elements collectively together and rigidify the cutters and providing the sole means to key the cutters and spacer elements to said mandrel.

2. A rotary cutter assembly as set forth in claim 1 and wherein said mandrel is of hollow tubular construction, the anchor member projects across and closes said one end of the mandrel, said cutter assembly further includes a solid closure member that is disposed in, extends across, and is fixedly connected to the rim region at the other end of the mandrel, one of said supporting shafts is integrally formed with the anchor member, and the other supporting shaft is integrally formed with the closure member.

3. A rotary cutter assembly as set forth in claim 1 and wherein each spacer element is in the form of a flat washer-like disk that encircles one of said clamping bolts.

References Cited

UNITED STATES PATENTS

| | | | |
|---|---|---|---|
| 2,174,782 | 10/1939 | Erickson | 144—248 |
| 3,186,651 | 6/1965 | Briolini | 241—243 |
| 3,240,243 | 3/1966 | Golick | 51—267 |

ROBERT C. RIORDON, *Primary Examiner.*

D. G. KELLY, *Assistant Examiner.*